(12) United States Patent
Du

(10) Patent No.: US 9,909,689 B2
(45) Date of Patent: Mar. 6, 2018

(54) PIPELAYING

(71) Applicant: Subsea 7 Limited, Sutton (GB)

(72) Inventor: David Du, Houston, TX (US)

(73) Assignee: Subsea 7 Limited, Sutton (GB)

( * ) Notice: Subject to any disclaimer, the term of this patent is extended or adjusted under 35 U.S.C. 154(b) by 85 days.

(21) Appl. No.: 14/771,781

(22) PCT Filed: Mar. 3, 2014

(86) PCT No.: PCT/GB2014/050610
§ 371 (c)(1),
(2) Date: Aug. 31, 2015

(87) PCT Pub. No.: WO2014/135849
PCT Pub. Date: Sep. 12, 2014

(65) Prior Publication Data
US 2016/0025240 A1    Jan. 28, 2016

(30) Foreign Application Priority Data
Mar. 4, 2013    (GB) .................................. 1303802.1

(51) Int. Cl.
*F16L 1/20* (2006.01)
*F16L 1/24* (2006.01)

(52) U.S. Cl.
CPC .. *F16L 1/20* (2013.01); *F16L 1/24* (2013.01)

(58) Field of Classification Search
CPC ........................................................ F16L 1/20
See application file for complete search history.

(56) References Cited

U.S. PATENT DOCUMENTS

| | | | | |
|---|---|---|---|---|
| 3,456,448 A | * | 7/1969 | Fernandez | E02B 17/021 37/346 |
| 3,531,761 A | * | 9/1970 | Clift, Jr. | G01V 1/3826 114/245 |
| 4,068,770 A | * | 1/1978 | Boehringer | B60R 3/02 14/71.1 |
| 4,242,010 A | * | 12/1980 | Gjerde | F16L 1/123 405/157 |
| 4,307,977 A | | 12/1981 | Haney | |
| 4,789,269 A | * | 12/1988 | Ayers | F16L 1/16 405/158 |
| 6,887,016 B1 | | 5/2005 | Skeels | |

(Continued)

FOREIGN PATENT DOCUMENTS

| | | |
|---|---|---|
| GB | 2267107 | 4/1992 |
| GB | 2480488 | 11/2011 |

(Continued)

*Primary Examiner* — Tara Mayo-Pinnock
(74) *Attorney, Agent, or Firm* — Levy & Grandinetti

(57) ABSTRACT

A mudmat for a subsea pipeline accessory has a body with an accessory support structure arranged to lie underneath and support an accessory. At least one foundation element attached to the body is movable from a stowed position at least partially under the accessory support structure into a deployed position extending laterally from the accessory support structure after overboarding the accessory from a vessel and before landing the accessory on the seabed. Two or more foundation elements may be deployed simultaneously in laterally-opposed directions transverse to the longitudinal axis of a pipe that supports the accessory.

30 Claims, 9 Drawing Sheets

(56) References Cited

U.S. PATENT DOCUMENTS

| | | | |
|---|---|---|---|
| 7,010,825 B1* | 3/2006 | Finch Salas | A61G 3/061 14/69.5 |
| 7,186,069 B2* | 3/2007 | Ehler | B60P 3/12 414/462 |
| 7,674,075 B2* | 3/2010 | Renard | F16L 1/20 405/224 |
| 2008/0038066 A1 | 2/2008 | Renard et al. | |
| 2009/0108614 A1* | 4/2009 | Washington | B60P 1/435 296/61 |

FOREIGN PATENT DOCUMENTS

| | | |
|---|---|---|
| WO | WO 00/60262 | 10/2000 |
| WO | WO 2011/110950 | 9/2011 |
| WO | WO 2012/101525 | 8/2012 |
| WO | WO 2013/068717 | 5/2013 |

* cited by examiner

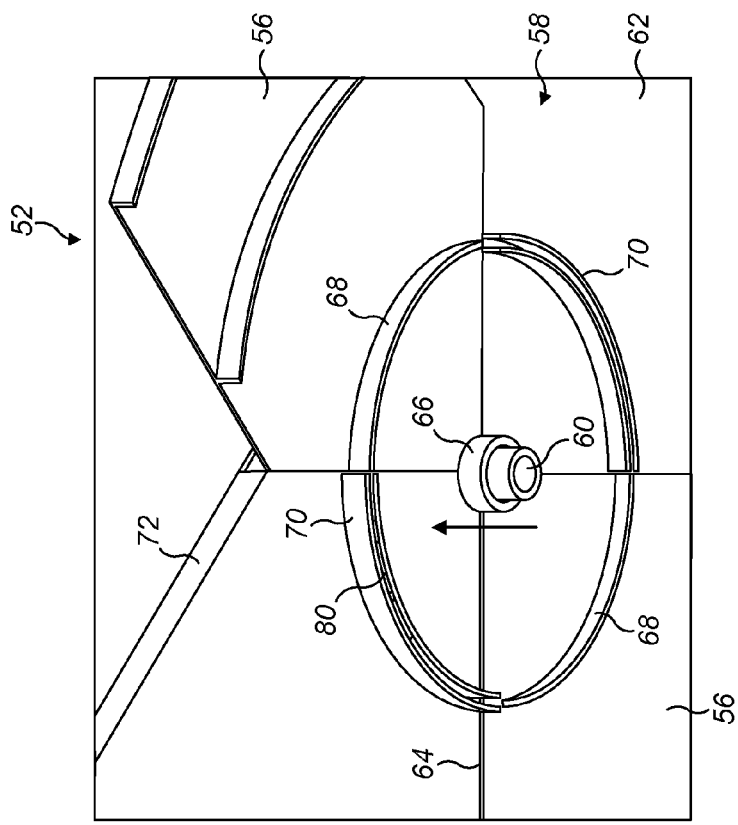
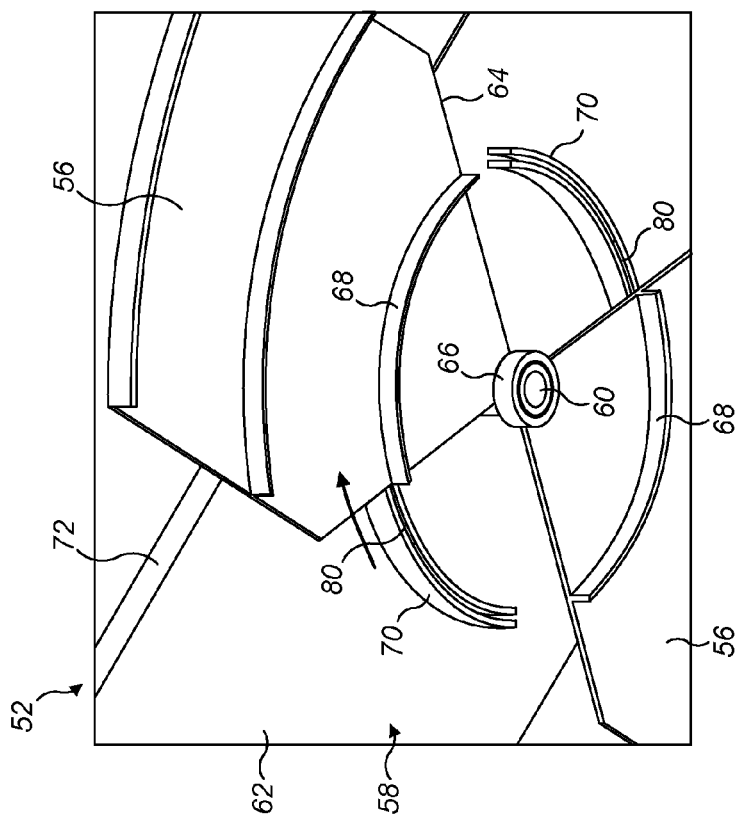
FIG. 6a
FIG. 6b

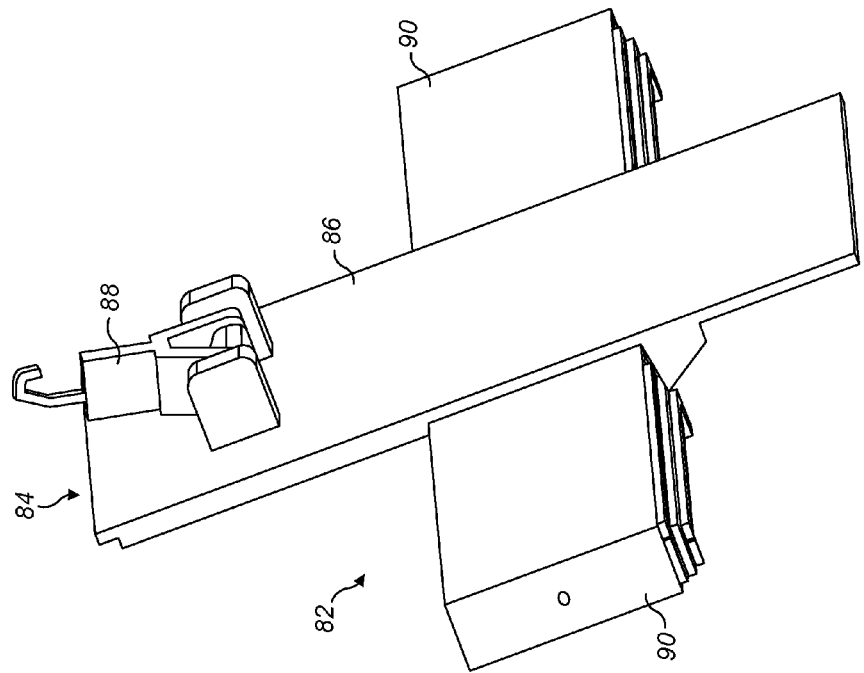
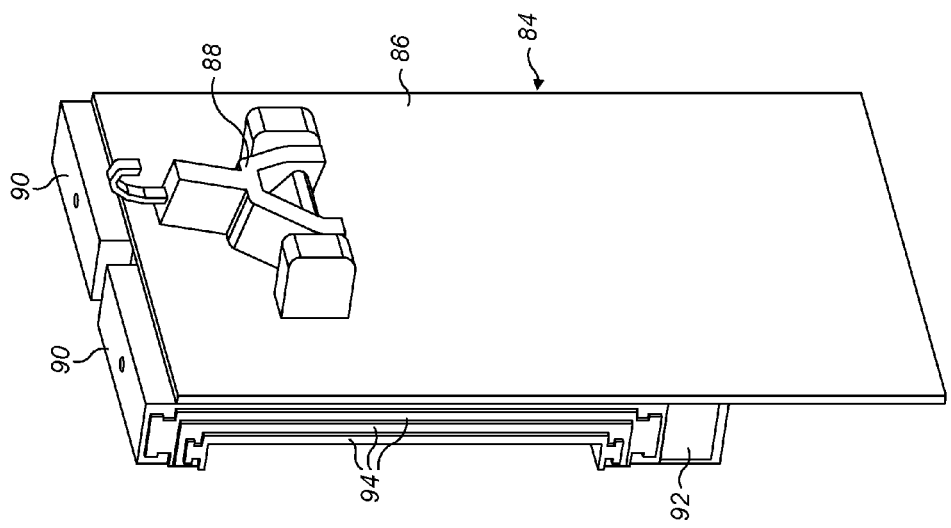
FIG. 8b
FIG. 8a

PIPELAYING

This Application is the U.S. National Phase of International Application Number PCT/GB2014/050610 filed on Mar. 3, 2014, which claims priority to GB 1303802.1 filed on Mar. 4, 2013.

This invention relates to marine pipelaying using a pipelaying vessel to lay an offshore pipeline. The invention relates particularly to pipeline accessory structures such as in-line tee assemblies, and to pipelaying systems and methods in which such structures are incorporated into a pipeline during fabrication and are then deployed on the seabed.

Marine pipelaying techniques that involve fabrication of a rigid pipeline on a vessel are generally categorised as either S-lay or J-lay, although variants and hybrids of those techniques have been proposed and used.

The S-lay technique involves welding together successive pipe sections or 'joints' at a series of working stations in a generally horizontal firing line on the deck of a pipelaying vessel, from which the pipeline is launched into the water over a stinger. A series of tensioners grip the pipe to control its movement relative to the vessel under the load of the free span of the pipe extending between the vessel and the seabed.

The J-lay technique is usually preferred over S-lay when pipelaying in deep and ultradeep water, particularly with large-diameter pipes. J-lay involves welding single or multiple pipe joints onto the pipe end in a substantially vertical or near-vertical orientation in a J-lay tower on a pipelaying vessel. The pipe is launched downwardly into the water as it is formed.

S-lay benefits from a long production line with several working stations, and hence speeds the pipe fabrication process. Thus, where it can be used, S-lay is often preferred to J-lay for its inherently greater lay rate. Recently, this has led to the development of a variant of S-lay known as 'Steep S-lay', which is adapted for deep and ultradeep water applications where the pipe diameter allows. As its name suggests, Steep S-lay involves setting the lift-off point of the pipe from the stinger as close to vertical as possible. References in this specification to S-lay are intended to encompass Steep S-lay.

Pipelines are commonly fitted with accessories during fabrication to provide operational flexibility, to create desired field layouts and to support future field extensions. Such accessories may be disposed at the ends of the pipeline and within it. They include in-line tee assemblies (ILTs or ITAs), pipeline end manifolds (PLEMs), pipeline end terminations (PLETs), tie-in branches, shutdown valves, pigging connections and other subsea structures.

An accessory must be supported by a foundation when it is laid on a soft, muddy seabed, as is common in deep and ultradeep water. The foundation must support the weight of the accessory, keeping the accessory and the attached pipe stable by resisting rotation and lateral movement while also avoiding excessive settlement into the seabed.

A common type of deep-sea foundation is a mudmat. A mudmat typically comprises a horizontal top plate, which is usually rectangular, atop a vertical peripheral skirt. Mudmats are typically 5 m to 10 m in width and 10 m to 20 m in length, with skirt depths up to about 0.5 m. There may also be vertical partition walls disposed under the top plate and intersecting the surrounding skirt to stiffen and support the top plate and to improve engagement with the seabed.

In typical deep-water applications, the critical failure modes of a mudmat are lateral sliding and overturning. The skirt and the walls under the top plate dig in to the seabed to locate the mudmat and the supported accessory against sliding across the seabed. However, the mudmat also has to cope with the high centre of gravity of the accessory it supports and the torque that may be applied by jumpers or spools attached to the accessory when in position for use, while keeping the accessory and the pipe stable without becoming embedded in the seabed.

In principle, therefore, a mudmat should be as long and wide as possible to define a large base area. However, there are limits on mudmat size imposed by considerations of cost, weight and ease of installation.

Clearly, pipeline installation is not solely a pipelaying activity but also involves handling and lowering accessories attached to the pipe. Consequently, the overall speed of pipeline installation is not determined simply by the rate at which a vessel can lay pipe, but also by the ability of the vessel to install accessories as part of the pipeline. In this respect, a weakness of S-lay is the integration of large accessories into the pipeline, which may need to be installed over the side of the vessel and hence interrupt the laying operation. J-lay is better suited than S-lay to adding such accessories to the pipeline, which offsets the inherently greater lay rate of S-lay to some extent. However, the J-lay tower of a pipelaying vessel also limits the maximum size of accessories that may be incorporated into the pipeline in J-lay operations.

To ease the integration of large accessories in pipeline installation operations, a solution is to pass only a part of the accessory structure through open tensioners, grippers or clamps of a pipelaying vessel, and then to assemble the full structure, including mudmats, after or downstream of the tensioners, grippers or clamps. However, there is a limit to the size of structure that may pass through the tensioners, grippers or clamps; also, the deck layout of the vessel may impose space constraints after the tensioners, grippers or clamps.

In WO 2011/110950, mudmats are pre-installed on the seabed, for example by a crane, and pipeline accessories are docked with the mudmats upon laying the pipeline across them. However, the pre-installation of mudmats is time-consuming and it can be challenging to land the accessories onto their target mudmats in a subsequent operation.

It is also known for pipeline accessories to be fitted with foldable mudmats that are overboarded in a compact folded configuration and then opened into a deployed configuration upon, or just before, reaching the seabed. An example of this approach is disclosed in WO 2012/101525, which employs mudmats that swing down from the folded configuration into the deployed configuration about longitudinal pivot axes that lie generally parallel to the pipe that carries the accessory.

The folding mudmat solution exemplified by WO 2012/101525 is a good way to exploit the available space on a pipelaying vessel. However, it can be problematic to control the orientation of an accessory fitted with a folding mudmat during pipelaying, as the accessory must be kept upright as it passes over the stinger and in mid-water supported by the free span of the pipe before touchdown on the seabed. In this respect, an accessory fitted with folding mudmats tends to be sensitive to lateral sea motion during lowering, which may induce instability and apply torque to the pipeline during installation. Folding mudmats may also suffer from higher impact loads when transiting the splash zone near the sea surface and require added buoyancy during installation, which can be difficult to handle. These challenges may limit the sea state in which pipeline installation can be performed, potentially locking up highly-valuable marine assets while waiting for a suitable weather window and, of course, delaying completion of the installation project.

In any event, the maximum size of an accessory fitted with folding mudmats is still limited to the space that is available around the firing line of the vessel, meaning that the available mudmat area may not be sufficient to support a particularly heavy accessory.

In addition, careful attention must be paid to how folding mudmats are released from the folded configuration and caused to move into the deployed configuration. ROV intervention or remote operation will be necessary if these operations are performed on or near the seabed. The pipe lay angle may not allow gravity alone to unfold and deploy the mudmats, hence requiring expensive and bulky hinges and power systems. ROV intervention may also be needed to install or to operate the accessory, so it is important to leave enough space for ROV access.

Mudmats for platform legs are known, such as those described in U.S. Pat. No. 4,307,977. Such mudmats are not relevant to the present invention as they need not pass through the firing line of a pipelay vessel. The general installation method is to lower them by crane, which makes their size less of an issue.

U.S. Pat. No. 6,887,016 discloses a circular mudmat equipped with outwardly-pivoting legs. As the legs dig into the seabed, they open and splay apart to expand the bearing area. This system is impractical and is not easily designed or fabricated to land and support heavy and bulky structures.

GB 2267107 discloses a flexible mudmat comprising cable nets and a geotextile membrane, but this has insufficient bearing capacity for heavy steel structures.

WO 2013/068717 discloses apparatus for underwater pile-driving that has fold-down pile-drive guides.

WO 00/60262 discloses pipe lift frames with fold-down mudmats.

It is against this background that the present invention has been devised.

In one sense, the invention resides in a mudmat for a subsea pipeline accessory, the mudmat comprising: a body having an accessory support structure arranged to lie underneath and support an accessory; and at least one foundation element attached to the body and movable outwardly from a stowed position that is at least partially, and preferably fully, under the accessory support structure into a deployed position extending laterally from the accessory support structure.

The inventive concept embraces a corresponding method of laying a subsea pipeline from a vessel onto the seabed, comprising: overboarding from the vessel an accessory supported by a pipe, the accessory being attached to a mudmat comprising an accessory support structure disposed under the accessory; and deploying at least one foundation element outwardly from a stowed position that is at least partially under the accessory support structure into a deployed position extending laterally from the accessory support structure. Preferably the foundation element is deployed after overboarding the accessory from the vessel and before landing the accessory on the seabed.

Of course, the inventive concept also extends to an accessory, or a pipeline comprising an accessory, fitted with the mudmat of the invention or laid by the method of the invention.

By virtue of the invention, the centre of gravity of the mudmat and hence of the accessory fitted with the mudmat is kept as low as possible, to the benefit of stability. Also, by tucking the foundation element under the accessory support structure when stowed, the assembly is kept compact to pass along the firing line of the vessel and is less susceptible to disturbance when transiting the splash zone before the foundation element is deployed. These advantages allow pipelaying to be performed in higher sea states and so reduce waste of time and hence money while waiting on the weather.

Advantageously, the body of the mudmat provides additional foundation area in use when the mudmat is laid upon the seabed. Consequently, walls of the body serving as skirts and partitions under the accessory support structure define a hollow cavity that conveniently accommodates the foundation element when stowed. This means that the thickness of the mudmat can be kept to a minimum.

Ignoring its underside profile which may also comprise a skirt and partition walls, a foundation element is preferably a substantially flat and, suitably, cuboidal panel in outline shape. Its thickness including a skirt is suitably less than 10% of its length and more commonly no more than 5% of is length.

The foundation element preferably largely comprises an intrinsically lighter material than the material of the body. In this way, the foundation elements help to reduce the overall weight of the mudmat assembly to the further benefit of stability and to reduce added buoyancy requirements, which eases installation.

The foundation element may be supported for rotation relative to the body to effect movement into the deployed position. For example, the foundation element may be angularly movable around a pivot supported by the body. In that case, the foundation element may be connected to the pivot by a swing arm that effects lateral movement of the foundation element during rotation into the deployed position.

It is possible for more than one foundation element to be mounted on a common pivot. For example, first and second foundation elements may be joined to each other and disposed one each side of the common pivot. It is also possible for a plurality of pivots to be supported by the body, each pivot supporting at least one foundation element for rotation relative to the body during movement into the deployed position.

In addition to or instead of rotation, the foundation element may be supported for translation relative to the body during movement into the deployed position. For example, the foundation element and the body may have laterally-extending rail elements that cooperate to support the foundation element for sliding lateral movement relative to the body.

The foundation element may lie in a first plane in the stowed position and remain in the same plane during movement into the deployed position. Alternatively, the foundation element may move into a second plane generally parallel to the first plane during movement into the deployed position.

To allow the foundation element to move from one plane into another parallel plane in this way, the foundation element may, for example, be connected to a pivot by a fixing that is movable along a pivot axis of the pivot. The foundation element may move from the first plane into the second plane before, during or preferably only after completing rotational or translational movement toward the deployed position.

The foundation element preferably lies in a substantially horizontal plane when the mudmat is oriented to lie on a generally horizontal seabed, when the foundation element is in the stowed position, in the deployed position and preferably but not essentially in transition between the stowed and deployed positions.

For optimal compactness while maximising their surface area, foundation elements may lie in stacked relation under the accessory support structure. However, it is also possible for foundation elements to lie in side-by-side relation under the accessory support structure.

To enable optional expansion of a foundation area of a foundation element after movement from the stowed position, the foundation element may comprise movable expansion pieces. Such expansion pieces may be in nested relation when the foundation element is the stowed position; they suitably cooperate telescopically to expand the foundation area of the foundation element in the deployed position.

A drive mechanism may act between the or each foundation element and the body to drive movement of the or each foundation element into the deployed position. By virtue of the orientation of the mudmat during lowering, gravity may be used to drive or assist deployment and/or expansion of the or each foundation element.

The or each foundation element may be secured temporarily in the stowed position during transportation and installation through the splash zone at least. After deployment, the or each foundation element may then be locked in the deployed position before or after installation of the accessory at a definitive seabed location.

In general, when plural foundation elements are in the stowed and deployed positions, the mudmat of the invention is preferably substantially symmetrical about a vertical plane containing the pipe course. The body of the mudmat will generally have a length that defines a longitudinal direction to be aligned with a pipe axis in use and a width that is less than the length. In this case, the foundation elements suitably extend from under the accessory support structure in a widthwise direction during movement from the stowed state into the deployed state. Preferably, the foundation elements extend simultaneously from under the accessory support structure in opposed widthwise directions.

The method of the invention is most advantageously practised in an S-lay operation involving bending the pipe over a stinger, although it is possible for the invention to be used with benefit in a J-lay operation instead.

In order that the invention may be more readily understood, reference will now be made, by way of example, to the accompanying drawings in which:

FIGS. 6a and 6b are enlarged detail perspective views from underneath the mudmat shown in FIGS. 5a, 5b and 5c but without the accessory, here showing the pivoting extensions in part-deployed and fully-deployed states respectively;

Figure 8C:
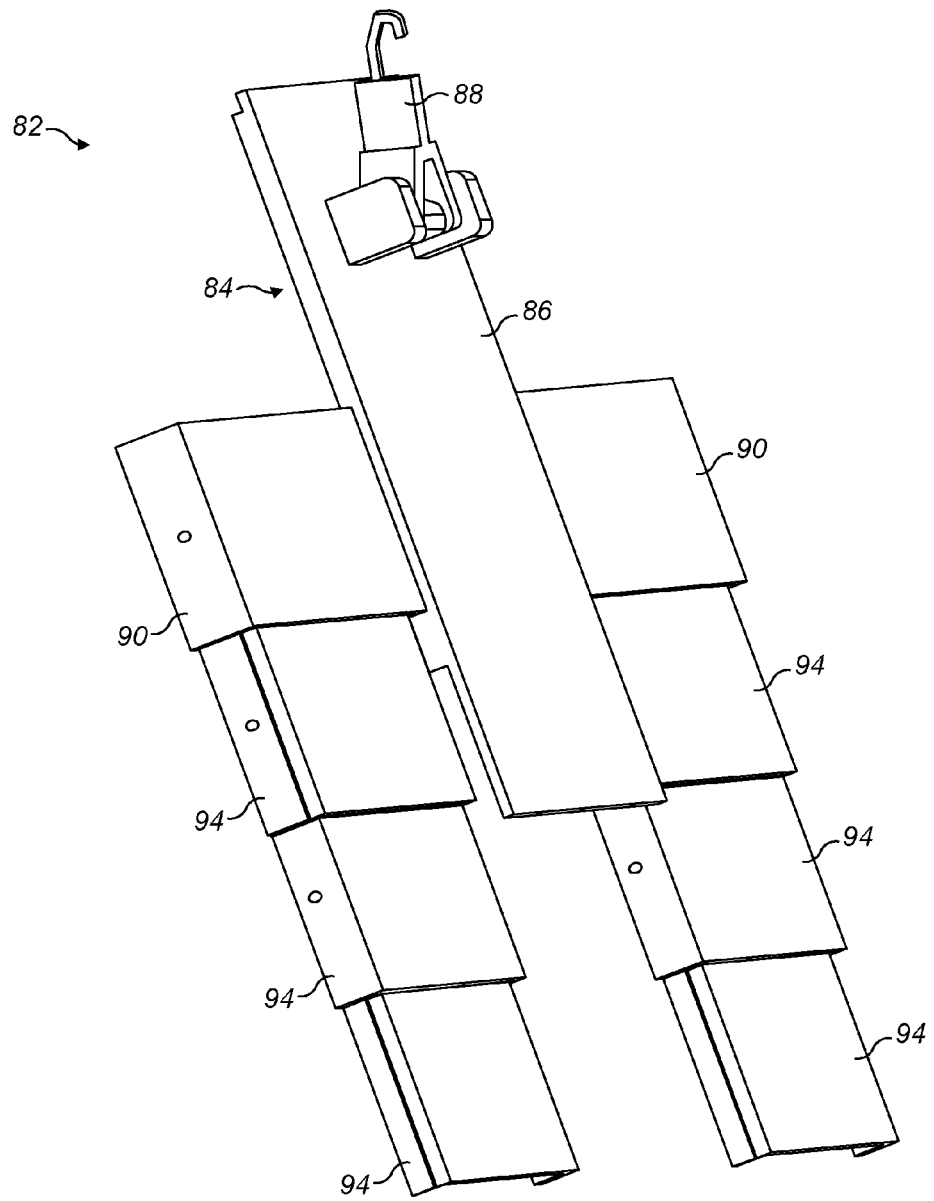
Figure 9:
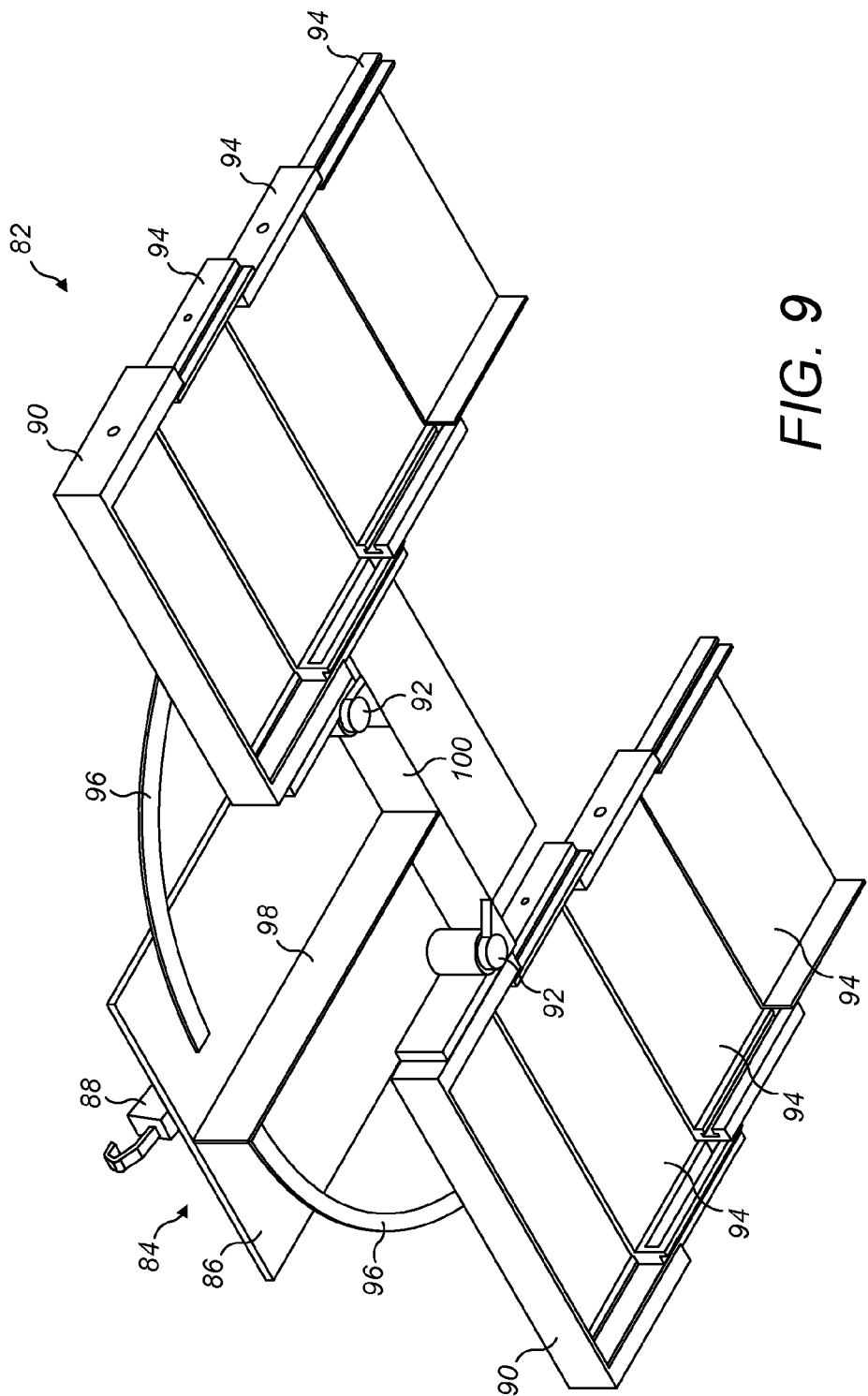

FIGS. 8a, 8b and 8c are perspective views from above of a mudmat in accordance with a fifth embodiment of the invention, with sliding and pivoting extensions of the mudmat being shown in FIG. 8a in a stowed state, in FIG. 8b in a part-deployed state and in FIG. 8c in a fully-deployed state; and FIG. 9 is a perspective view from underneath of a variant of the fifth embodiment shown in FIGS. 8a, 8b and 8c.

Figure 1A:
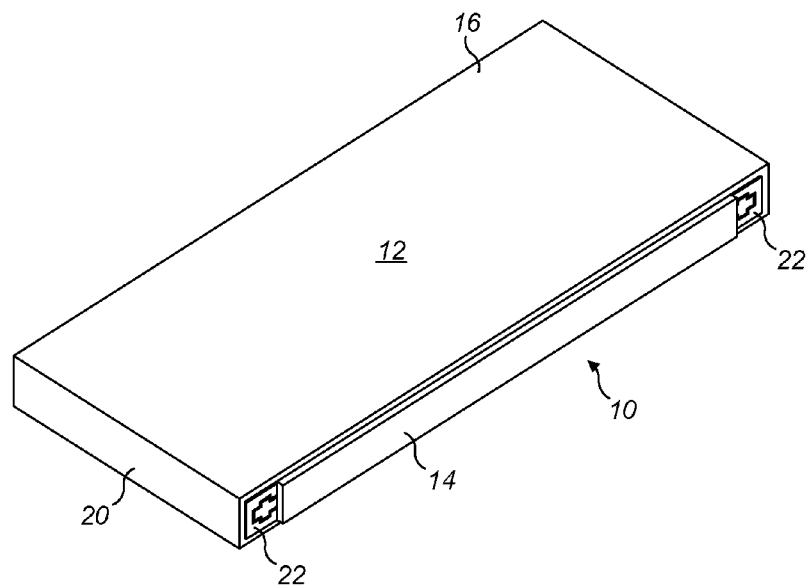
FIGS. 1a and 1b are perspective views from above of a mudmat in accordance with a first embodiment of the invention, with sliding extensions of the mudmat being shown in FIG. 1a in a stowed state and in FIG. 1b in a deployed state.
Figure 1B:
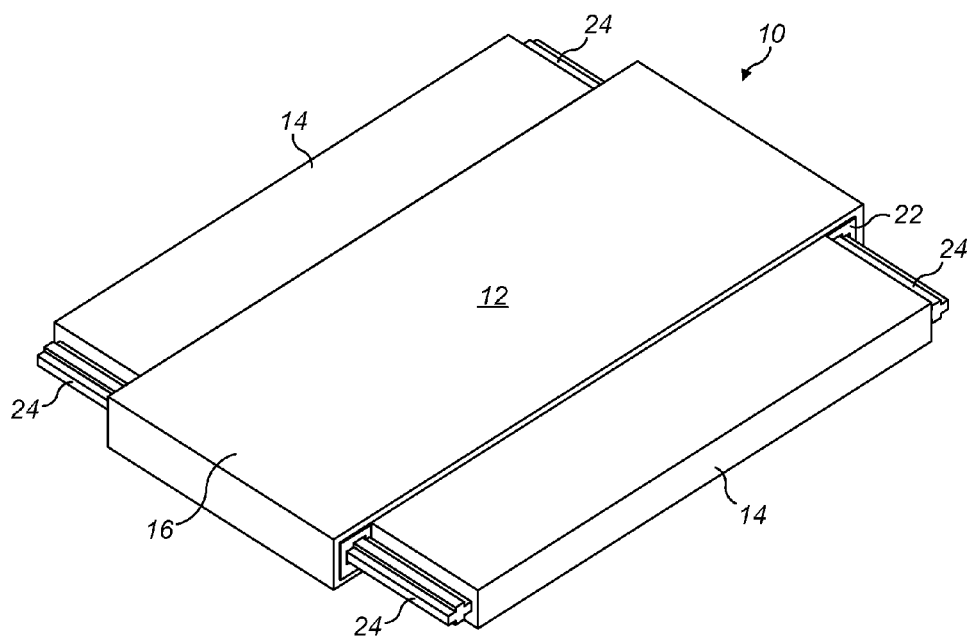
Figure 2:
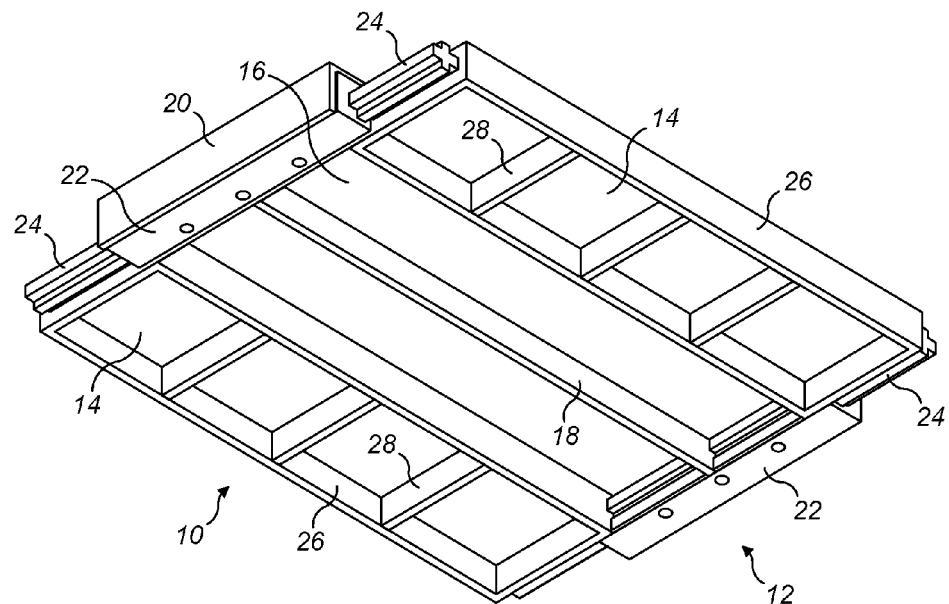
FIG. 2 is an enlarged perspective view from underneath of the mudmat shown in FIGS. 1a and 1b, with the extensions in the deployed state as shown in FIG. 1b.

Referring firstly to the first embodiment of the invention shown in FIGS. 1a, 1b, and 2, a mudmat 10 comprises a flat oblong central body 12 and sliding oblong extensions 14 that serve as foundation elements once landed on the seabed. The extensions 14 are arranged to slide symmetrically outwards, protruding like wings from open long sides of the body 12 for deployment after transiting the splash zone, preferably as the mudmat 10 approaches the seabed. The extensions 14 are shown in FIG. 1a in a stowed position retracted within the body 12 and in FIGS. 1b and 2 in a deployed position extended from the body 12.

When the mudmat 10 is in use, a top plate 16 of the body 12 serves as an accessory support structure to support an accessory. The accessory has been omitted from these figures for clarity.

As FIG. 2 best shows, the body 12 is hollow underneath the top plate 16 to accommodate the extensions 14 side-by-side under the top plate 16 in the stowed position. For this purpose, the width of each extension 14 is slightly less than half of the overall width of the body 12 and the length of each extension 14 is slightly less than the overall length of the body 12.

The space under the top plate 16 is divided longitudinally by a spine wall 18 that extends along the central longitudinal axis of the body 12 to lie between the extensions 14 when they are stowed.

Each of the closed short sides of the body 12 comprises an end wall 20 that supports an inwardly-facing laterally-extending C-section channel 22. The channels 22 lie longitudinally outboard of the extensions 14 when they are stowed under the top plate 16 of the body 12. A laterally-extending rail 24 on the adjacent short side of each extension 14 fits into and slides along the channel 22 to support the extension 14 for sliding movement relative to the body 12.

A release and drive mechanism is required to unlatch the extensions 14 for deployment and to drive their movement from the stowed position into the deployed position. That release and drive mechanism may conveniently be integrated into the channels 22. Drive may be effected in various ways, such by a rack-and-pinion system, by hydraulics or, preferably, by a spring-loaded system. Drive springs may act in tension or compression between points on the extensions 14, for example the rails 24, and opposed points on the body 12, for example the channels 22.

FIG. 2 also shows that the underside of each extension 14 is surrounded by a peripheral skirt 26 and crossed by longitudinally-spaced transverse partition walls 28. Once deployed, the extensions 14 lie substantially level and coplanar with each other and with the seabed upon deployment, with their skirts 26 and partition walls 28 embedded in the seabed.

The skirt 26 and partition walls 28 stiffen the extensions 14 and, by embedding into the seabed, help to locate the mudmat 12 once positioned for use. The spine wall 18 and end walls 20 of the body 12 similarly help to locate the mudmat 12 on the seabed.

Typically the mudmat 10 will have an footprint of about 3 m×7 m (21 m$^2$) when the extensions 14 are stowed and a deployed footprint of about 33 m$^2$ when the extensions 14 are deployed, from which it follows that the extensions 14 will each extend about 0.9 m beyond the long sides of the body 12 when they are deployed. Also, the skirt 26 and partition walls 28 will typically be about 300 mm deep. All of these figures are exemplary and so are not limiting.

It is envisaged that the body 12 will be predominantly of steel. To minimize weight, the extensions 14 may comprise aluminium or a fibre-reinforced polymer composite such as fiberglass, which may be in the form of panels supported by a steel frame. Such materials are substantially lighter than steel but have sufficient strength, stiffness and corrosion resistance to meet functional requirements for the extensions 14.

Figure 3:
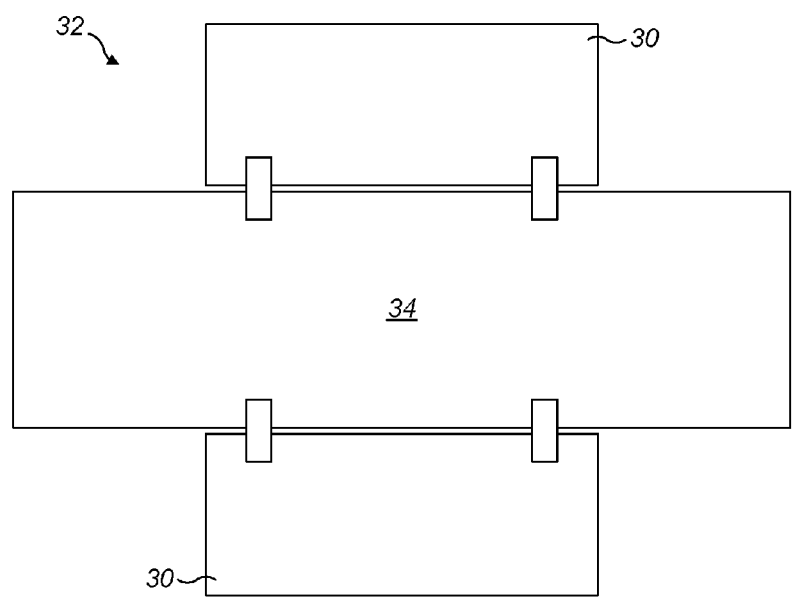
FIG. 3 is a schematic plan view of a mudmat in accordance with a second embodiment of the invention, having laterally-sliding extensions whose length is substantially shorter than the overall length of the mudmat.

The second embodiment of the invention shown schematically in FIG. 3 of the drawings demonstrates that extensions 30 of a mudmat 32 may be substantially shorter than a central body 34, for example between one-third and one-half of the length of the central body 34. With longitudinally-repositioned channels and rails, the extensions 30 shown in FIG. 3 may slide outwardly from the body 34 in a manner similar to that of the first embodiment described above.

Figure 4:
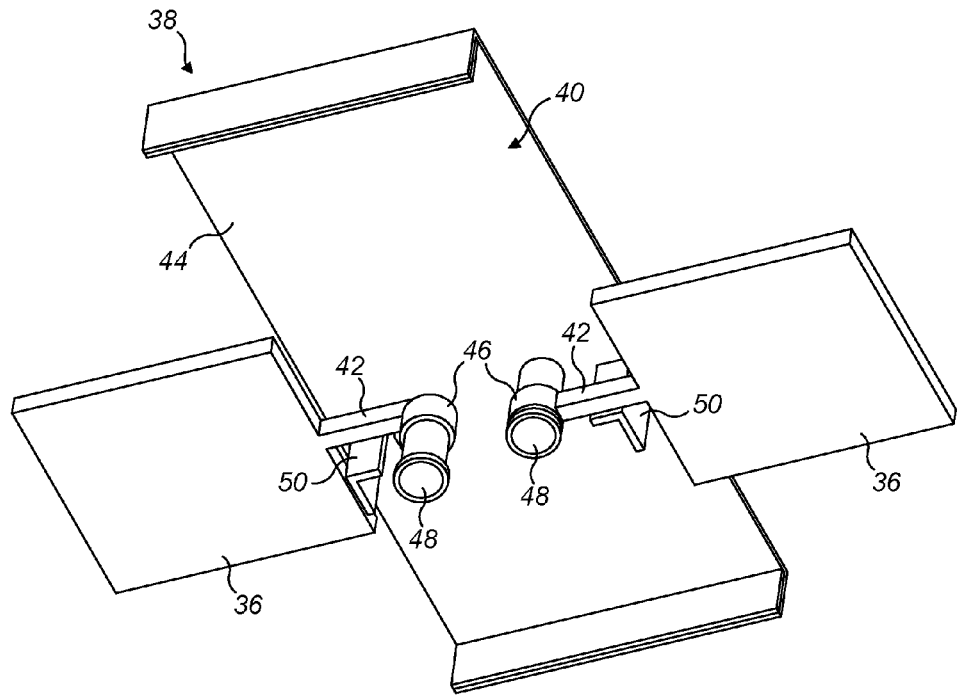
FIG. 4 is a perspective view from underneath of a mudmat in accordance with a third embodiment of the invention, with pivoting extensions shown in a deployed state.

A third embodiment of the invention shown in FIG. 4 of the drawings demonstrates that extensions 36 of a mudmat 38 need not slide or translate relative to a central body 40 for deployment but may instead pivot or rotate relative to the body 40. In this example of that principle, each extension 36 is mounted on a swing arm 42 that turns through about 90° between the stowed position and deployed position. Specifically, when the extensions 36 are stowed beneath a top plate 44 of the body 40, the swing arms 42 are oriented generally longitudinally in parallel and when the extensions 36 are deployed through each open side of the body 40, the swing arms 42 are oriented transversely and in lateral alignment as shown in FIG. 4.

To enable this movement, the swing arms 42 are pivotally mounted by respective collars 46 to respective ones of a pair of parallel posts 48 that hang orthogonally from the top plate 44 of the body 40. The posts 48 are each of cylindrical shape and circular cross-section; they have enlarged flanged ends to retain the collars 46.

Each swing arm 42 is long enough to describe a radius of arc that places the associated extension 36 wholly or substantially outside the width of the body 40 on deployment. L-section stop members 50 hang orthogonally from the top plate 44 beside each post 48 to block further angular movement of the swing arms 42 upon full deployment of the extensions 36.

The extensions 36 of the mudmat 38 shown in FIG. 4 are large to maximize their surface area: indeed, their width in each case approaches the overall width of the body 40. Consequently, the extensions 36 are so large that if they are to be stowed at the same end of the body 12, they must lie in parallel planes with one extension 36 overlying the other when stowed. The extensions 36 then lie in stacked relation, if not necessarily in contact with each other. In this respect, it will be apparent from FIG. 4 that the swing arm 42 and collar 46 on the post 48 shown to the right in that figure are longitudinally displaced along its pivot axis to lie lower than the swing arm 42 and collar 46 on the post 46 shown to the left in that figure.

At least one of the collars 46—in FIG. 4, at least the collar 46 on the post 48 shown to the right in that figure—can slide along the associated post 48. This allows the weight of the mudmat 38 and the supported accessory to urge the extensions 36 into the same plane after deployment, upon being laid on the seabed. The top plate 44 moves downwardly under that weight force, so that upward movement of the swing arms 42 and collars 46 may be regarded as a relative movement with respect to downward movement of the top plate 44 and the posts 48.

As in the preceding embodiments, a mechanism may be required to drive the extensions 36 from the stowed position into the deployed position. That mechanism may conveniently be a rack-and-pinion system, an hydraulic system or a spring-loaded system acting between the collars 46 and the posts 48.

Turning next to FIGS. 5a to 7b, these show a mudmat 52 supporting an accessory 54 in a fourth embodiment of the invention. This embodiment also provides for rotation of extensions 56 relative to a central body 58. Here, the extensions 56 are symmetrically opposed about a central pivot pin 60 that hangs from an oblong top plate 62 of the body 58.

In this example, by virtue of converging inboard edges 64 in the same horizontal plane, an inboard portion of each extension 56 tapers symmetrically about a common central longitudinal axis toward a circular bush 66 that encircles the pivot pin 60 and connects the extensions 56. The resulting arrangement of the extensions 56 has a butterfly or bow-tie shape in plan view.

Optionally, the converging inboard edges 64 of each extension 56 lie orthogonally with respect to each other as shown. It follows that the tapering inboard portion of each extension 56 describes 90° of arc—a quarter circle—about the bush 66.

Figure 5A:
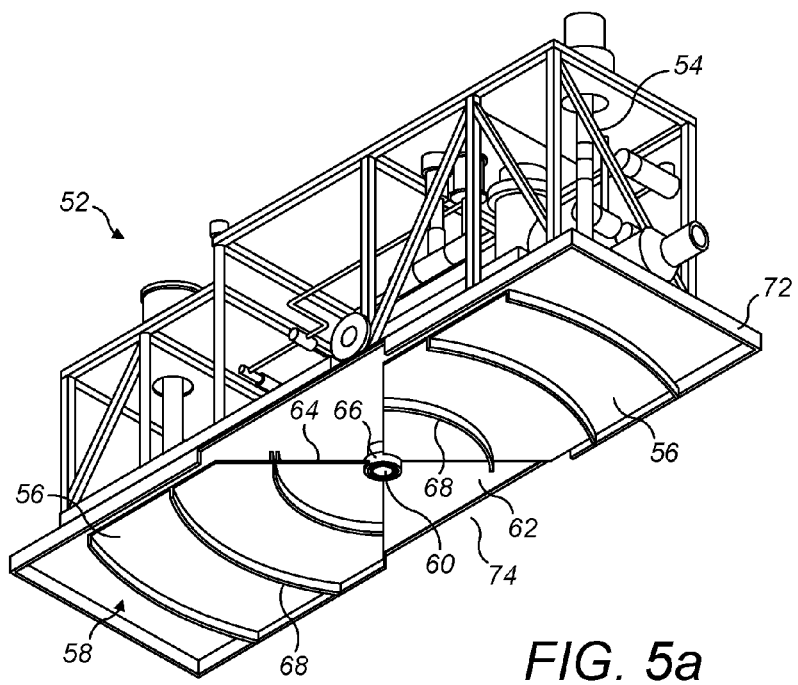
FIGS. 5a, 5b and 5c are a sequence of perspective views from underneath an accessory fitted with a mudmat in accordance with a fourth embodiment of the invention, showing pivoting extensions in stowed, part-deployed and fully-deployed states respectively.

The pivot pin 60 lies in a longitudinally central position on the central longitudinal axis of the body 58. Thus, in a stowed position as shown in FIG. 5a, the extensions 56 lie in longitudinal alignment under the top plate 62 of the body 58. Upon deployment through the intermediate position shown in FIGS. 5b, 6a and 7a into the fully-deployed position shown in FIGS. 5c, 6b and 7b, the extensions 56 turn in the same angular direction about the pivot pin 60 but consequently move in opposite lateral directions with respect to the body 58.

Figure 5B:
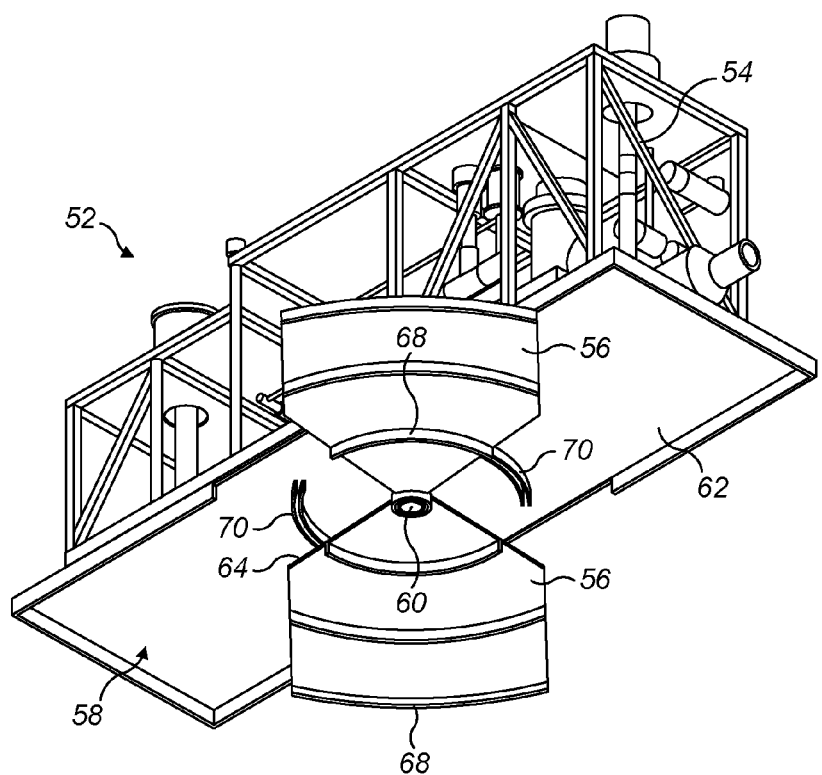
Figure 5C:
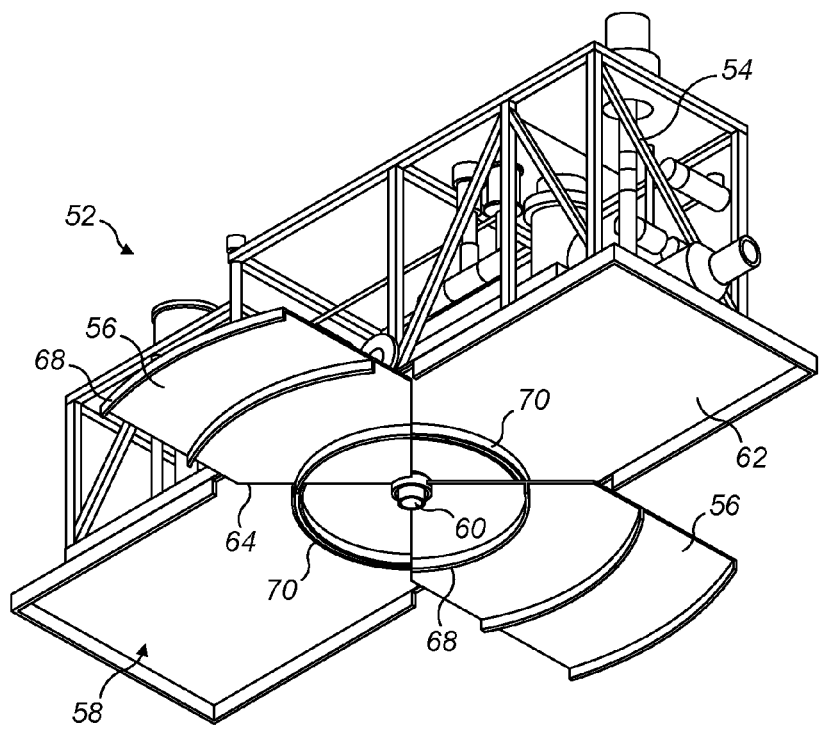
Figure 7B:
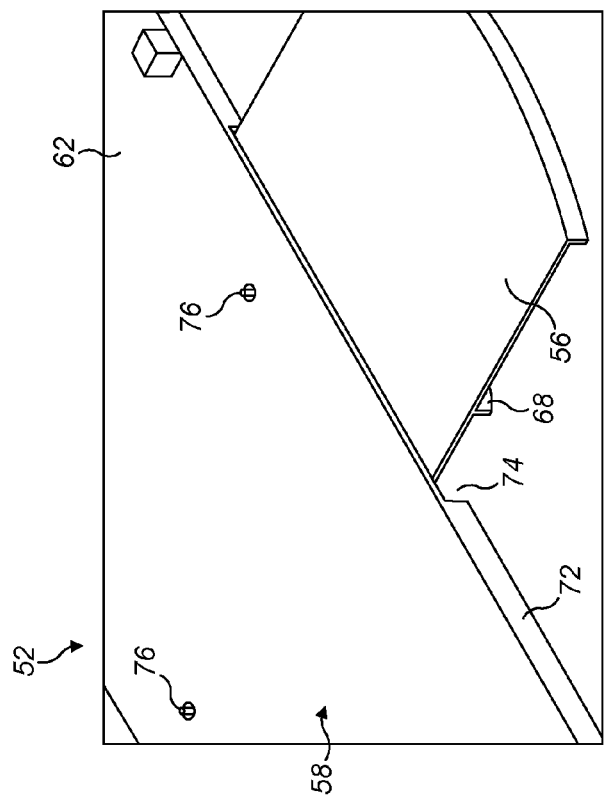
FIGS. 7a and 7b are enlarged detail perspective views from above the mudmat, corresponding to the views from underneath shown in FIGS. 6a and 6b.

Upon reaching the fully-deployed position shown in FIGS. 5c, 6b and 7b, the common longitudinal axis of the extensions 56 lies orthogonally with respect to the central longitudinal axis of the body 58. In this position, the converging inboard edges 64 of the extensions 56 terminate slightly inboard of the long side edges of the top plate 62 so that outboard full-width portions of the extensions 56 protrude laterally beyond the body 58.

As best shown in FIGS. 5a, 5b and 5c, the underside of each extension 56 comprises a series of curved walls 68 that are concentric about a common axis of curvature aligned with the pivot pin 60. The walls 68 function as skirts or partitions to embed into the seabed upon landing and hence to locate the mudmat 52.

In plan view from underneath, part-circular downwardly-opening channels 70 on the underside of the top plate 62 are opposed about the pivot pin 60. Each channel 70 lies on the central longitudinal axis of the body 58 and is symmetrical about that axis. In this example, each channel 70 describes 90° of arc—a quarter circle—about the pivot pin 60 and this leaves quarter-circular angular gaps between the channels 70 to each side of the mudmat 52.

The channels 70 lie on the same radius and centre of curvature as the innermost walls 68 of the extensions 56. In the stowed position shown in FIG. 5a when the extensions 56 lie in longitudinal alignment under the top plate 62, the extensions 56 lie under and conceal the channels 70. However upon deployment into the fully-deployed position as shown in FIGS. 5c and 6b, the channels 70 are revealed and complete a circle with the innermost walls 68 of the extensions 56. In this respect, it will be noted that the innermost walls 68 are also quarter-circular as they span the tapering inboard portions of the extensions 56.

Comparison of FIGS. 6a and 6b will show that the bush 66 between the extensions 56 can be displaced longitudinally along the pivot pin 60. In FIG. 6a, the bush 66 is at the lower end of the pivot pin 66 to allow the extensions 56 to lie beneath the channels 70 in the stowed and intermediate positions. In FIG. 6b, the bush 66 has slid up the pivot pin 60 to allow the extensions 56 to move up against the underside of the top plate 62 as the tapering inboard portions of the extensions 56 fit into the quarter-circular gaps between the channels 70.

Figure 7A:
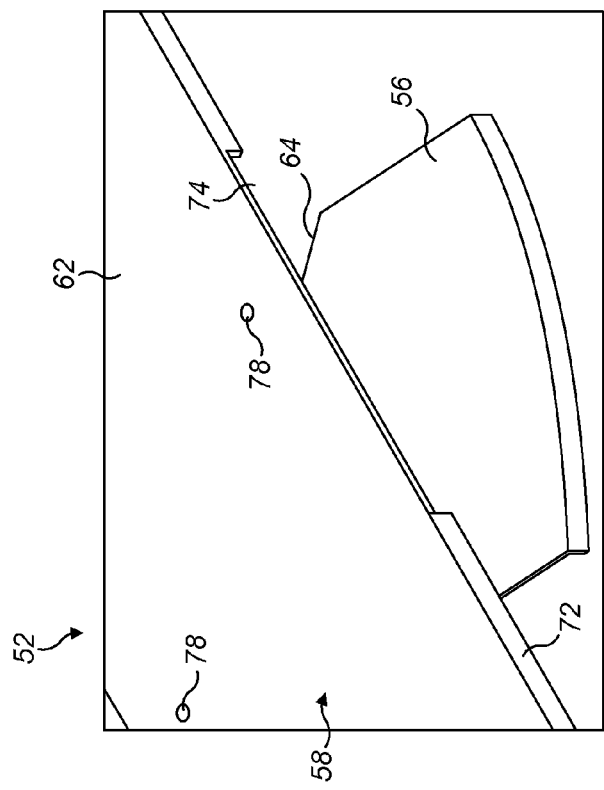

FIGS. 7a and 7b correspond to FIGS. 6a and 6b but show the mudmat 52 from above. These views, and FIG. 5a, best show that a peripheral skirt 72 around the top plate 62 is interrupted by opposed gaps 74 in long sides of the body 58 aligned with the pivot pin 60. The gaps 74 in the skirt 72 accommodate the full-width portions of the extensions 56 when the extensions 56 reach the fully-deployed position shown in FIG. 7b. The gaps 74 then provide clearance for the extensions 56 to be pushed up against the underside of the top plate 62 as the mudmat 52 settles onto the seabed after landing. As a result of that vertical movement, latch pins 76 on the upper side of the extensions 56 engage into corresponding holes 78 in the top plate 62 after the extensions 56 reach the fully-deployed position shown in FIG. 7b.

Again, the top plate 62 sinks downwardly upon landing under the weight of the mudmat 52 and the accessory 54, so that upward movement of the bush 66 and extensions 56 may be regarded as a relative movement with respect to downward movement of the top plate 62 and the pivot pin 60.

As in the preceding embodiments, a mechanism may be required to drive the extensions 56 from the stowed position into the deployed position. That mechanism may conveniently be a rack-and-pinion system, an hydraulic system or a spring-loaded system. Preferably, as shown in FIGS. 6a and 6b, the mechanism is a spring-loaded system comprising springs 80 in the channels 70 that act in compression between the channels 70 and the extensions 56. A suitable release system may comprise ROV-releasable latches acting between the extensions 56 and the top plate 62 when the extensions 56 are in the stowed position shown in FIG. 5a.

It may be possible to use gravity to drive or assist deployment of pivoting extensions if a mudmat is sufficiently inclined when it is in the free span of pipe between the surface and the seabed. Also, movement of the extensions relative to the central body could be a combination of translation and rotation. The fifth embodiment of the invention shown in FIGS. 8a, 8b, 8c and 9 illustrates these possibilities.

In the mudmat 82 of the fifth embodiment, an oblong body 84 is shown in a near-vertical orientation in FIG. 8a as at a mid-water stage of the lowering process. The body 84 is shown at a shallower, but still steep, orientation in FIGS. 8b and 8c as at a later stage of the lowering process, just before landing on the seabed. The top plate 86 of the body 84 supports a hinged hook 88 near its upper end, by which a wire from the pipelaying vessel can support the weight of the mudmat 82 and an attached accessory (not shown) atop the body 84 during lowering through the water column.

The mudmat 82 has extensions 90 that, in mid-water, are retained in a stowed position under the top plate 86 of the body 84 and within its width as shown in FIG. 8a. Each extension 90 is supported by a respective hinge 92 that hangs under an outboard edge of the top plate 86 just below a bottom outer corner of the extension 90 when stowed.

Upon reaching a depth suitable for deployment, which is preferably just above the seabed, the extensions 90 are released firstly to pivot outwardly a quarter-turn each about their hinges 92, hence swinging in a widthwise direction from the long sides of the body 84 from the stowed position into the part-deployed position shown in FIG. 8b.

Next, the extensions 90 themselves extend by sliding downward telescopic movement of nested extension elements 94 to adopt the fully-deployed position shown in FIG. 8c. Each extension element 94 has C-section side walls shaped to be embraced by a side wall of an outer extension element 94 and/or to embrace a side wall of an inner extension element 94 for relative telescopic sliding movement.

The mudmat 82 and the attached accessory is then ready to be laid on the seabed with the benefit of a greatly increased foundation footprint area. In this embodiment, solely by way of example, the footprint of the mudmat 82 before the extensions 86 are deployed has a length of about 5.2 m×3.2 m, equating to a footprint area of just under 17 $m^2$. Once deployed, the footprint area increases to about 40 $m^2$.

It will be apparent that both the pivoting and sliding movements of deployment are aided by gravity due to the inclination of the mudmat 82. Nevertheless, a mechanism could be employed to drive, control or assist these movements by hydraulic, mechanical or spring force.

FIG. 9 shows an optional addition to the fifth embodiment, namely curved rails 96 that extend between the underside of the top plate 86 and the top of each extension 90. The rails 96 supplement the hinges 92 to support and control outward pivotal movement of the extensions 90.

The view from underneath of FIG. 9 shows that the space under the top plate 86 is divided longitudinally by a spine wall 98 that extends along the central longitudinal axis of the body 84 to lie between the extensions 90 when they are stowed. FIG. 9 also provides more detail of the hinges 92, showing them to be supported by respective ends of a transverse partition wall 100 at a lower end of the spine wall 98.

Many other variations are possible without departing from the inventive concept. For example, in a variant of the third embodiment, it would also be possible for more than one extension to swing about a single pivot post or for there to be more than two such posts, each supporting one or more extensions. For example one post may be disposed near each corner of the oblong body to make a total of four posts, each supporting a respective extension. So, in some variants of the third embodiment, it would be possible to stow extensions at different ends of the central body.

Rails used to support sliding extensions of the invention may be telescopic. Springs used in drive mechanisms of the invention may be of steel or, for lighter weight, of a fibre-reinforced polymer composite material.

A foldable mudmat solution—exemplified by WO 2012/101525 which was acknowledged above as prior art—could be combined with the solutions of the present invention to create additional foundation area if required.

The invention lends itself to a modular mudmat system in which a suitable central body can be selected from a set of such bodies of incrementally increasing length and width. Then, suitable numbers, shapes and sizes of extensions and appropriate drive and support systems for those extensions may be selected from other sets of such components and assembled with the chosen body. The choice and configuration of these mudmat components will be driven by the size, weight, shape and other characteristics of the accessory to be supported and by the seabed conditions expected at the installation location.

The invention claimed is:

1. A mudmat for a subsea pipeline accessory, the mudmat comprising:
   a body having an accessory support structure arranged to lie underneath and support an accessory; and
   at least one foundation element attached to the body and movable from a stowed position at least partially under the accessory support structure into a deployed position extending laterally from the accessory support structure,
   wherein the at least one foundation element is supported for rotation relative to the body during movement into the deployed position.

2. The mudmat of claim 1, wherein the at least one foundation element is fully under the accessory support structure when in the stowed position.

3. The mudmat of claim 2, wherein the at least one foundation element is angularly movable around a pivot supported by the body.

4. The mudmat of claim 3, wherein the pivot defines a pivot axis and the at least one foundation element is connected to the pivot by a fixing that is movable along the pivot axis.

5. The mudmat of claim 3 and comprising a plurality of pivots supported by the body, each pivot supporting at least one of the at least one foundation elements for rotation relative to the body during movement into the deployed position.

6. The mudmat of claim 1, wherein the at least one foundation element is supported for translation relative to the body during movement into the deployed position.

7. The mudmat of claim 1, wherein the at least one foundation element is supported to lie in a first plane in the stowed position and to remain in the same plane during movement into the deployed position.

8. The mudmat of claim 1 wherein the at least one foundation element comprises first and second foundation elements and wherein, in their stowed positions, the first and second foundation elements lie in side-by-side relation under the accessory support structure.

9. The mudmat of claim 1, wherein the or each foundation element comprises expansion pieces that are movable to expand a foundation area of the foundation element.

10. The mudmat of claim 9, wherein the expansion pieces are in nested relation when the foundation element is in the stowed position and cooperate telescopically to expand the foundation area of the foundation element in the deployed position.

11. The mudmat of claim 1, further comprising a drive mechanism acting between the or each foundation element and the body to drive movement of the or each foundation element into the deployed position.

12. The mudmat of claim 1, wherein the body has a length that defines a longitudinal direction to be aligned with a pipe axis in use and a width that is less than the length, and the or each foundation element extends from under the accessory support structure in a widthwise direction during movement from the stowed state into the deployed state.

13. The mudmat of claim 12, wherein the at least one foundation element comprises first and second foundation elements that extend from under the accessory support structure in opposed widthwise directions.

14. The mudmat of claim 1, wherein the body provides additional foundation area in use when the mudmat is laid upon the seabed.

15. The mudmat of claim 1, wherein the or each foundation element substantially comprises an intrinsically lighter material, by volume, than the material of the body.

16. The mudmat of claim 1, wherein the or each foundation element is a substantially flat panel in outline shape with a thickness less than 10% of its length.

17. The mudmat of claim 1, further comprising at least one temporary locking system to secure the or each foundation element temporarily in the stowed position.

18. The mudmat of claim 1, further comprising at least one permanent locking system to secure the or each foundation element in the deployed position.

19. A method of laying a subsea pipeline from a vessel onto the seabed, comprising:
    overboarding from the vessel an accessory supported by a pipe, the accessory being attached to a mudmat comprising an accessory support structure disposed under the accessory; and
    deploying at least one foundation element from a stowed position at least partially under the accessory support structure into a deployed position extending laterally from the accessory support structure.

20. The method of claim 19, wherein the at least one foundation element is deployed after overboarding the accessory from the vessel and before landing the accessory on the seabed.

21. The method of claim 19, wherein the at least one foundation element comprises first and second foundation elements that are deployed simultaneously in laterally-opposed directions transverse to a longitudinal axis of the pipe.

22. The method of claim 19 wherein the or each foundation element rotates relative to the accessory support structure during deployment.

23. The method of claim 19 wherein the or each foundation element translates relative to the accessory support structure during deployment.

24. The method of claim 19 wherein the or each foundation element lies in a first plane in the stowed position and remains in the same plane during movement into the deployed position.

25. The method of claim 19, wherein the or each foundation element lies in a first plane in the stowed position and moves into a second plane generally parallel to the first plane during movement into the deployed position.

26. The method of claim 25, wherein the or each foundation element moves from the first plane into the second plane after completing rotational or translational movement toward the deployed position.

27. The method of claim 19, comprising expanding a foundation area of the or each foundation element after its movement from the stowed position.

28. The method of claim 19, comprising using gravity to drive or assist deployment and/or expansion of the or each foundation element.

29. The method of claim 19, comprising temporarily securing the or each foundation element in the stowed position during transportation and installation through the splash zone.

30. The method of claim 19, comprising locking the or each foundation element in the deployed position before or after installation at a definitive seabed location.

* * * * *